March 8, 1938.   J. KANN   2,110,840
METHOD AND APPARATUS FOR DISPENSING BEVERAGES
Filed Jan. 13, 1936   3 Sheets-Sheet 1
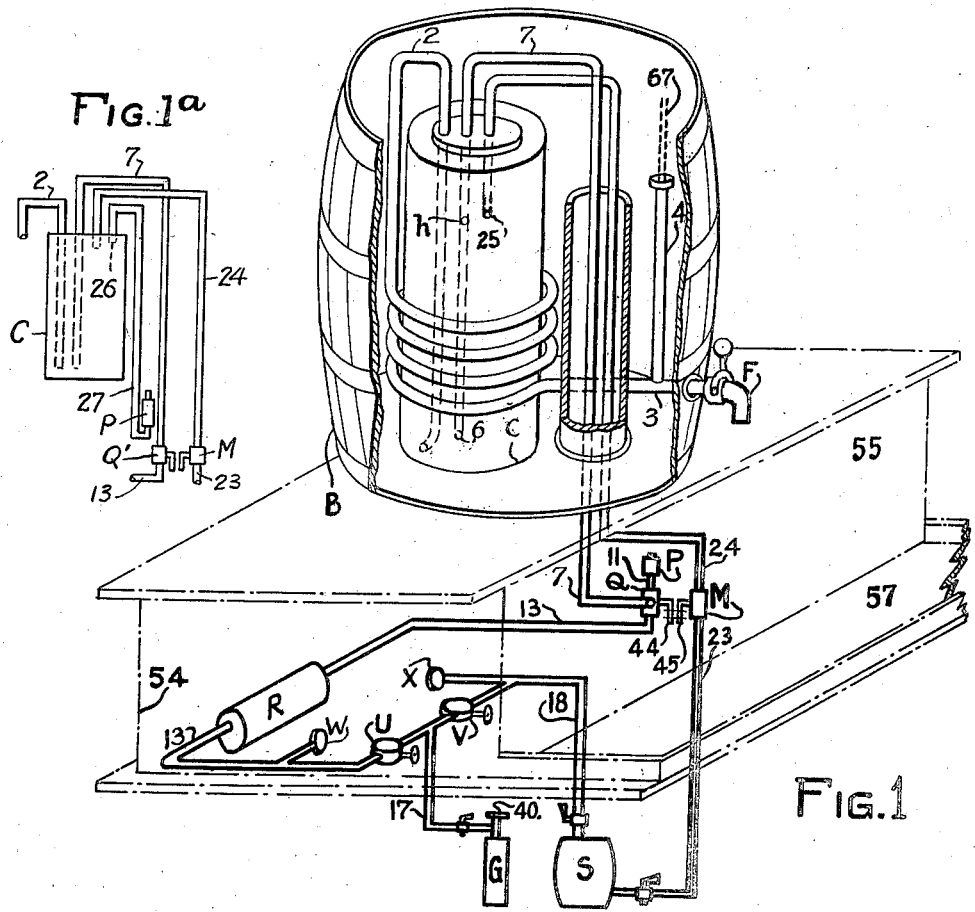
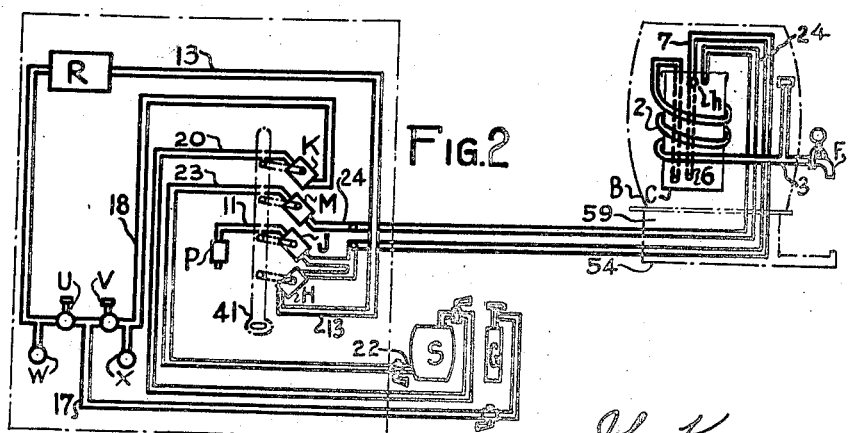
*John Kann* INVENTOR.

March 8, 1938. J. KANN 2,110,840
METHOD AND APPARATUS FOR DISPENSING BEVERAGES
Filed Jan. 13, 1936 3 Sheets-Sheet 2

John Kann INVENTOR.

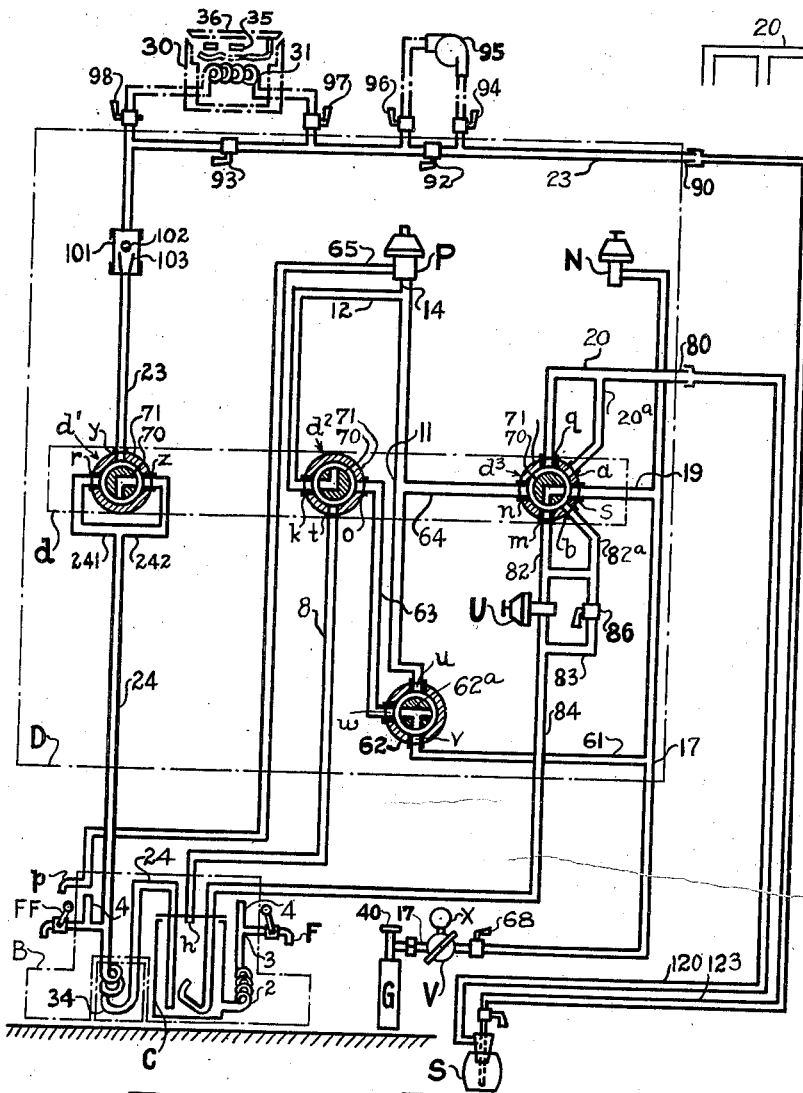

Patented Mar. 8, 1938

2,110,840

UNITED STATES PATENT OFFICE 2,110,840

METHOD AND APPARATUS FOR DISPENSING BEVERAGES

John Kann, New York, N. Y., assignor to Wallace & Tiernan Products, Inc., Belleville, N. J., a corporation of New Jersey Application January 13, 1936, Serial No. 58,936

26 Claims. (Cl. 225—1)

This invention relates to beverage dispensing and more particularly to the dispensing of beverages containing a gas in solution under pressure. The invention has been made especially for the purpose of providing an improved method and apparatus for the dispensing of beer, but the invention is applicable generally to the dispensing of other brews and other carbonated beverages, and some features of the invention may be found useful for other liquids and for other purposes. This application is a continuation in part of my application Serial No. 578,287, filed December 1, 1931, for Improvements in liquid dispensing apparatus.

The invention aims generally to provide an improved dispensing method and apparatus by which clear, live beer or other gas charged beverage may readily be dispensed at a desired temperature with a desired proportionate amount of foam, and which will avoid many disadvantages and objectionable features of dispensing systems heretofore used. Other specific objects of the invention will be pointed out in or appear from the following description.

The invention comprises a method wherein the beer or other beverage is transferred from the delivery keg or other supply container to a dispensing container without loss of its contained gas, and is thereafter dispensed from the dispensing container under a suitable gas pressure applied to the dispensing container for retaining gas in the beverage and for dispensing the beverage through a draft faucet; and wherein the beverage is cooled by being passed through a cooling zone as it flows between the delivery keg and the dispensing container, or by being circulated from the dispensing container through a cooling zone and back to the container, or otherwise; and wherein, most desirably, the entire contents of the delivery or supply container is transferred to the dispensing container in one continuous operation. The invention also includes various apparatus features for carrying out the method.

A full understanding of the invention can best be given by a detailed description of illustrative apparatus embodying the apparatus features of the invention and adapted for practicing the method, and the use thereof in practicing the method, and such a description will now be given in connection with the accompanying drawings, in which:—

Fig. 1 is a somewhat diagrammatic isometric view of an apparatus embodying features of the present invention suitable for use in dispensing beer;

Fig. 1a is a detail diagrammatic view showing a modification of certain parts shown in Figs. 1 and 2;

Fig. 2 is a diagrammatic view partly in plan of the apparatus of Fig. 1 slightly modified;

Fig. 4 is a diagrammatic view of a further modified apparatus according to the invention;

Fig. 4a is a diagrammatic view of a part of the apparatus of Fig. 4 showing a connection to be described;

Fig. 5 is a view in elevation partly in section illustrating a further modification;

Figure 6:
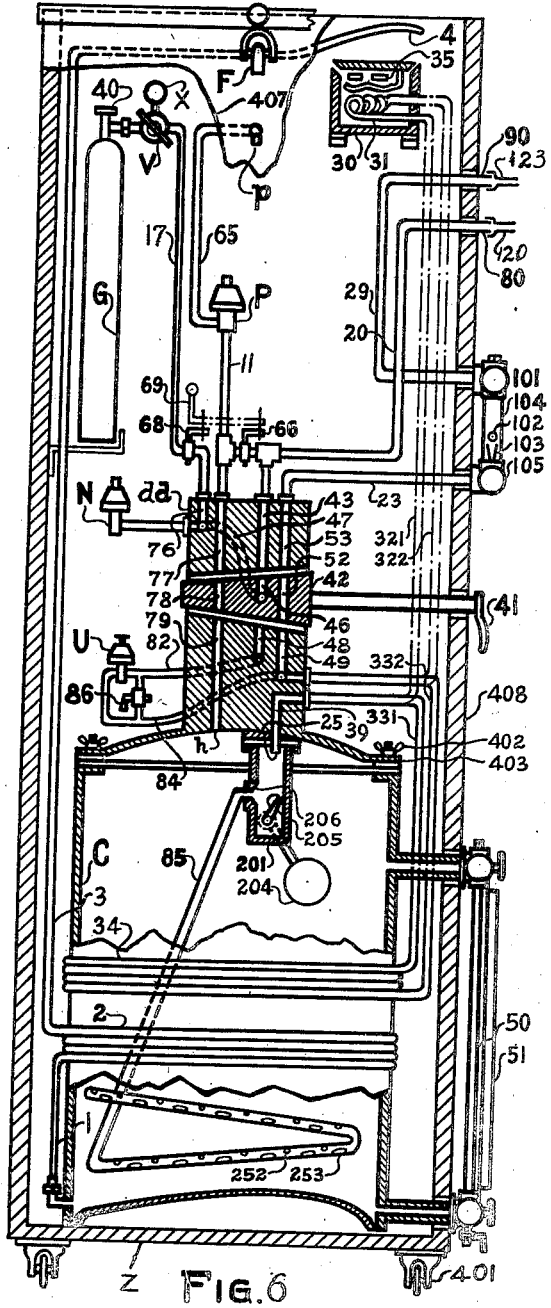
Fig. 6 is a view in sectional elevation of another embodiment of the invention.
Figure 8:
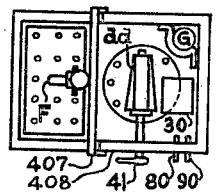
Fig. 8 is a plan view on the scale of Fig. 7 of the apparatus of Figs. 6 and 7 with the cover of the main casing removed.
Figure 7:
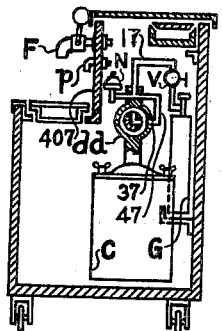
Fig. 7 is a sectional elevation of the apparatus of Fig. 6 taken on line 7—7 of Fig. 6, but on a smaller scale and with the container C is shown in elevation.

Referring to the drawings, and first to Fig. 1, the dispensing container C, which may be of any suitable size, shape, material and construction, is mounted within a housing B having heat insulating walls, which also may be of any suitable material, size and shape, and which as shown is of barrel shape and is mounted on a box-like support or cabinet 54 having an access door 55 and a drip tray 57. A tube or pipe 2 leads from the bottom of container C upward through the top and then out through the housing to a dispensing outlet or faucet F, the pipe desirably being coiled downward about the container as shown. A tube or reservoir 4 extends upward from the pipe 2 and most desirably at a point 3 close to the faucet F. This tube or reservoir 4 may be of any suitable size and shape and either closed at its upper end as shown or connected, as by a tube 67 indicated by dotted lines, to any suitable source of gas supply. The housing B is adapted to contain in the space about the container C any suitable refrigerant, such as ice, cold liquid, or air, or a cooling coil, for cooling the contents of the container and the dispensing pipe 2.

The container C is connected to a gas pressure supply G, such as a container of, most desirably, carbon dioxide, in gaseous, liquid or solid form; the connection being by pipe 7 leading from the bottom of the container at 6 to a valve Q and thence by pipes 13 and 17 to the gas container G. Connected in the pipe 13 is a pressure reducing and regulating valve U, and a gas reservoir R may also be connected in pipe 13. A pressure relief valve P is also connected by a pipe 11 to valve Q, and the pipe 7 has a vent opening $h$ within and near the top of container C. In one position of the handle 44 of valve Q, the pipe 7 is connected to the pressure relief valve P and in another position of the valve handle pipe 7 is connected to pressure supply G. The container C is also connected by pipe 24 to a valve M and thence by pipe 23 to a keg or other liquid supply container S. The pressure supply tank G also is connected to the top of the liquid delivery container S by a pipe 18 extending from the pipe 17 and having connected therein a pressure reducing and regulating valve V. Pressure indicators W and X may be provided as shown in the pipes 13 and 18. The gas tank G has the usual shut-off valve 40, and the ends of the pipes 17 and 18 adjacent to the tank G and container S, respectively, are provided with shut off valves as shown. The pipe 24 leads from the top of the container C downward through a water sealing shield 60 extending up from the bottom of the housing B, and through the bottom of the housing and into the cabinet.

Valve Q for connecting container C to the relief valve P or to the pressure source G, and the valve M for controlling the connection between containers C and S, may be operated individually but most desirably have their operating handles 44 and 45 pinned as indicated in the drawings, or otherwise, so as to operate in unison as a unitary control valve. In one position of this unitary control valve, container C is connected through the valve M to the bottom of the supply container S and through valve Q with the relief valve P. Gas pressure from G being then supplied to container S, liquid will be forced from container S into container C, and during the transfer of liquid into container C all gas therein above a desired pressure will escape through the opening $h$ and through pipe 7 and the pressure relief valve P. In the other position of the valves Q and M, the liquid flow connection from container S to container C is closed by valve M, and the valve Q closes the connection from container C to the pressure relief valve P and opens connection from the gas pressure supply G to container C. A desired gas pressure as determined by the pressure reducing and regulating valve U is thus applied from container G to container C, and the liquid, cooled by its flow through the coil of pipe 2, may thus be dispensed from container C through faucet F under a predetermined dispensing pressure which is maintained so long as valves Q and M remain in the second described position.

The pressure required for transferring the liquid from container S at a desired rate into container C may be obtained by proper adjustment of the pressure regulating valve V. During transfer of liquid from container S to container C, the pressure in container C is kept by the pressure relief valve P at a constant predetermined value lower than the pressure applied to container S. After transfer, the pressure in container C may be maintained at the same or other desired predetermined value by having the pressure reducing valve U suitably pre-adjusted. A desired pressure may thus be maintained in container C whether or not transfer is taking place, and liquid may be dispensed from container C at any time with a desired proportion of foam. Furthermore, the proportion of foam to liquid may be changed merely by adjusting the valve U.

The amount of liquid in container C may thus be replenished at any time without interruption of the dispensing operations. When the whole contents of the supply container S has been transferred to container C and valve M has been closed, container S may be disconnected from the apparatus and removed, and another filled supply container may at any time thereafter be connected and further transfer may be made if and when desired; dispensing from container C being carried on meantime as desired. Before disconnecting and removing a container S, the valve in the gas supply line leading thereto must, of course, be closed.

Figure 10:
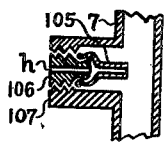
Fig. 10 is a detail sectional view through the vent opening $h$ of the pipe 6, 7, and showing vent opening provided with a check valve.

Fig. 10 shows the vent opening in gas pipe 7 provided with a flat rubber tube check valve 105 attached to a threaded tubular plug 106 screwed into a nipple 107 extending from the pipe. The check valve 105 permits gas to pass from container C into pipe 7 through vent opening $h$ and thus does not interfere with the venting of container C through pressure relief valve P, but it does prevent flow of gas from pipe 7 into the container through the vent opening $h$. The carbon dioxide or other gas in container C is thus compelled to enter at the bottom of the container through the opening at the lower end 6 of pipe 7. By so discharging the carbon dioxide gas near the bottom of the container, the beverage is more rapidly charged. Instead of providing the vent opening $h$ in the pipe 7, as shown in Figs. 1 and 2 container C may be vented through a separate pipe 27, as shown in Fig. 1a, leading from the top of container C directly to the back pressure valve P, the two-way valve Q being replaced by a shut-off valve Q' between the pipes 7 and 13. If the container is filled up to the level of the vent opening $h$ or the end 26 of the pipe 27, some foam or liquid will pass to and out from the pressure relief valve and vent P, serving as an indication to the operator that the container is full.

If a considerable period of time is allowed to pass without any beer being drawn from the container C, as over night, the beer standing in the draft tube 2 will be cooled to a lower temperature than that in container C and will require additional carbon dioxide gas to avoid flatness and cloudiness. The tube or reservoir 4 then serves to supply such additional gas for absorption by the liquid in that part of the tube 2 near the faucet, tube 4 being connected to a source of gas under suitable pressure or being dead-ended. When the tube 4 is dead-ended, upon the sudden closing of the faucet after each drawing operation, the jar of sudden stoppage of the liquid flowing in tube 2 tends to separate some of the gas from the liquid and gas so separated rises and accumulates in tube 4. Then when no liquid is drawn for a considerable period and the temperature of the liquid in tube 2 falls and needs more gas to prevent cloudiness and flatness, gas from the tube 4 is absorbed by the liquid, with the result that even after a considerable time of non-use, the first liquid drawn is suitably charged and fresh and of the desired creamy foam quality.

Fig. 2 shows an apparatus similar to that of Fig. 1 except that two separate shut-off valves J and H are provided in place of the two-way valve Q of Fig. 1, and that a shut-off valve K is provided in the pipe 18 for controlling the gas connection between gas tank G and delivery container S. Valve M controls the flow of liquid from container S to container C, valve J controls the flow of gas from container C to the pressure relief valve P, and valve H controls the supply of gas from tank G to container C. The other parts of the apparatus are as described in connection with Fig. 1. The valves K, M, J, and H are most desirably operated in unison by means of a master handle 41.

In one position of the valves K, M, J, and H of the unitary control, valve H is closed, and valves K, M, and J are open. Gas pressure is then applied to container S from the pressure supply G, and liquid from container S flows through valve M into container C and a predetermined pressure is maintained in C by escape of gas through vent opening $h$ under control of relief valve P. When the desired amount of liquid has been transferred to container C, the unitary control is shifted to its alternative position, in which valves K, M, and J are closed to shut off the flow of liquid from container S to container C and the flow of gas from gas tank G to container S and from container C out through relief valve P, and valve H is opened to cause gas at the pressure determined by the regulating valve U to be applied to container C. Supply container S may then be disconnected from the apparatus and removed. The gas charged liquid may be drawn from container C through faucet F at any time during the transfer or thereafter so long as there is liquid in container C.

Figure 3:
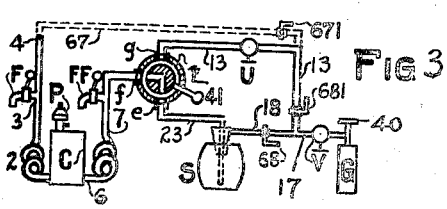
Fig. 3 is a diagrammatic view of a simplified apparatus embodying certain features of the apparatus of Figs. 1 and 2.

Fig. 3 shows a modified and somewhat simplified arrangement in which the relief valve P is connected directly to container C and valves Q and M of Figs. 1 and 2 are replaced by one two-way valve L. Valve L has three ports, $e$, $f$ and $g$, in its casing or stationary part, and a port in its movable part is adapted to connect $e$ and $f$ in one position and in another position to connect $f$ and $g$. A shut-off valve 68 is provided in pipe 18 leading to the delivery container S from the pressure gas container G. The gas pipe 13 leads to port $g$ of two-way valve L, and this pipe is provided with a shut-off valve 681 and with the pressure reducing and regulating valve U. The pressure reducing and regulating valve V is shown as connected in the pipe 17 which leads from gas pressure tank G to the pipes 18 and 13. Pipe 23 leads from the bottom of container S to valve port $e$, and pipe 7 leads from valve port $f$ to the bottom of container C. Dispensing faucet F is connected through pipe 2 containing a cooling coil to the bottom of container C, and the gas collecting tube or reservoir 4 is shown as extending upward from the point 3 in pipe 2 adjacent to faucet F. A second faucet F—F is shown as connected to the pipe 7. Suitable means such as the housing B of Figs. 1 and 2 may be provided for cooling container C and tube 2.

With the unitary control valve L positioned as shown in Fig. 3 and valve 68 open, gas pressure from tank G as determined by valve V is applied to container S, and under such pressure liquid flows from container S into container C, excess pressure being vented from container C through relief valve P. When the control valve is turned to a position 90° clockwise from that shown in Fig. 3 to connect ports $f$ and $g$, the liquid flow connection between container S and container C is closed, and, the valve 681 being open, gas pressure, further reduced by valve U, is applied to container C to maintain a desired dispensing pressure therein. The supply container S may then be disconnected and removed, valve 68 having first been closed.

Valve L may be turned to a third position in which container C is cut off both from container S and from the gas tank G, and with the valve 10 in this position liquid may be dispensed through faucet F or through faucet F—F so long as there is sufficient gas pressure in container C. Liquid may be dispensed through either faucet also during the transfer of liquid from container S to container C. Furthermore, if connection is made between pipe 2 and pipe 13 on the inflow side of valve U, as by the pipe 67 indicated by dotted lines in Fig. 3 provided with a valve 671, then with this valve 671 open, and valves 681 and 68 also being open, pressure in containers C and S will be equalized so that liquid can flow back from container C to container S by gravity if container S is in a position below the level of container C.

Another modified apparatus embodying certain additional apparatus features of the invention adapted for practicing certain additional method steps is illustrated by Fig. 4. In this figure the dispensing container C is shown as mounted within a refrigerating housing B as in Figs. 1 and 2 indicated by dotted lines, and a unitary control valve $d$, which performs the functions of the valves K, M, J, and H of Fig. 2 and certain additional functions, and which is represented by three sections through zones $d^1$, $d^2$, and $d^3$ of the valve within the dotted line rectangle to which the reference letter $d$ is applied, is shown, with certain other valves and connecting piping, as mounted within an enclosure represented by the dotted-line rectangle D.

The movable part 70 of each of the zones $d^1$, $d^2$, and $d^3$ of the unitary control valve $d$ has a right angle port connecting points of its periphery 90° apart. The stationary part 71 of zone $d^1$ has three ports $r$, $y$, and $z$, ports $r$ and $z$ being 180° apart with port $y$ midway between them. The stationary part of zone $d^2$ also has three ports $k$, $t$, and $o$, ports $k$ and $o$ being 180° apart with port $t$ midway between them. The stationary part of zone $d^3$ has six ports $m$, $n$, $q$, $a$, $s$, and $b$; $m$, $n$, $q$, and $s$ being spaced 90° apart, and $a$ being midway between $q$ and $s$, and $b$ being midway between $s$ and $m$.

Ports $r$ and $z$ of valve zone $d^1$ are connected by pipes 241 and 242, respectively, to pipe 24 which extends down into housing B and includes a coil 34 from which the pipe extends to near the bottom of container C. From port $y$, pipe 23 extends to a terminal 90 from which connection is made by pipe 123 to the bottom of liquid supply container S. A sight-flow indicator 101 is connected in the pipe 23. Mounted above the enclosure D, as shown, is a refrigerating housing 30 containing a cooling coil 31 which is connected through shut-off valves 97 and 98 to the pipe 23 on opposite sides of a shut-off valve 93, and a liquid circulating pump 95 is similarly connected through shut-off valves 94 and 96 to the pipe 23 on opposite sides of a shut-off valve 92. The housing 30 contains a suitable refrigerant, most desirably dry ice, as indicated at 35 supported from the housing cover 36.

Port $s$ of the valve zone $d^3$ is connected by pipe 19 to pipe 17 which extends from the compressed gas container G, pipe 17 being provided with a pressure reducing and regulating valve V and with a shut-off valve 68. The gas container is shown as provided with the usual shut-off valve 40 and the pressure reducing valve V with a pressure indicator $x$. Pipe 17 also extends beyond pipe 19 to a safety valve N. Ports $a$ and $q$ of valve zone $d^3$ are connected to pipe 20 which leads to terminal 80 from which connection is made by pipe 120 to the top of liquid supply container S. Ports $b$ and $m$ are connected by pipes 82 and 82a, respectively, to pipe 84 which leads to the bottom of container C and which contains a pressure reducing and regulating valve U. A shunt connection 83 normally closed by shut-off valve 86 extends from pipe 82a to join pipe 84 beyond valve U. Port $n$ of valve zone $d^3$ is connected by pipes 64 and 11 to pressure relief valve P, from which pipe 65 extends to vent opening $p$ mounted on the housing B. Port $n$ is also connected through pipe 11 to a port $u$ in the stationary part of a two-way valve 62. The stationary part of this valve has a second port $v$ diametrically opposite the port $u$ and a third port $w$ midway between ports $u$ and $v$. Port $v$ is connected by pipe 61 to the gas container G through pipe 17, and port $w$ is connected by pipe 63 to port $o$ of zone $d^2$ of the unitary valve $d$. Port $k$ of zone $d^2$ is connected by pipe 12 to the vent opening $p$ through relief valve P and pipe 65, and from port $t$ of this valve zone pipe 8 leads to container C, opening into the top of the container at $h$. In the position of the movable member 62a of valve 62, as shown in Fig. 4, communication is established between pipes 61 and 63, while if the movable valve member is turned 90° clockwise to its second position communication is established between pipes 61, 63, and 11.

In the operation of the apparatus as shown in Fig. 4:—When the movable element of the unitary valve $d$ is in its normal dispensing position as shown in Fig. 4, and which will be referred to as its first position, communication is established between pipes 19 and 82 so that gas from container G at pressure determined by valve U is supplied to container C through pipe 84; and no communication is established through the valve zones $d^1$ and $d^2$. There is, therefore, in this position of the unitary valve no communication between the supply container S and container C, and no gas pressure is applied to container S. With the unitary valve in this dispensing position, therefore, a predetermined gas pressure will be maintained in container C and liquid may be dispensed from container C under this maintained pressure through cooling coil 2 and faucet F, or through cooling coil 34 and faucet FF.

When the movable element of the unitary control valve $d$ is turned to its second position, 90° counter-clockwise from that shown in Fig. 4 gas supply container G is placed in communication with the top of liquid supply container S through valve zone $d^3$ which connects pipe 19 with pipe 20; and pipe 123 leading from the bottom of container S is placed in communication through pipe 23 and valve zone $d^1$ with pipe 242 and pipe 24 leading through cooling coil 34 to the bottom of container C; and communication is established by valve zone $d^2$ from the top of container C through pipes 8 and 12 to the pressure relief valve P and thence to vent outlet $p$. With the unitary valve in this position, therefore, gas pressure as determined by reducing valve V will be applied to liquid supply container S to force liquid therefrom into the container C from which excess pressure will be relieved through vent opening $p$ under control of pressure relief valve P. Liquid will thus be transferred from container S to container C, and a predetermined pressure will be maintained in container C. By closing valve 93 and opening valves 97 and 98, the liquid so flowing to container C may be caused to pass through the cooling coil 31.

When all the liquid has been transferred from container S, the gas pressure in the container S can then be used for dispensing liquid from container C by turning the movable element of the unitary control valve $d$ to a third position, 45° counter-clockwise from the position shown in Fig. 4. Container S will then be disconnected from container C through the valve zone $d^1$, and the vent connection from container C through valve zone $d^2$ will be closed, and the connection from gas supply container G through valve zone $d^3$ will be closed, but connection will be established between pipes 20a and 82a, thereby connecting the top of container S with container C through the reducing valve U so that the higher gas pressure in container S is reduced and applied to container C, and liquid may then be dispensed from container C under the desired dispensing pressure.

If the unitary valve $d$ is turned to a fourth position, 180° from the position shown in Fig. 4, and valve 62 is adjusted as shown in Fig. 4, the gas supply container G will be placed in communication with container C through valve 62 and zone $d^2$ of valve $d$, communication being thus established from the gas pipe 17 through pipes 61 and 63 to pipe 8 leading to container C; and the bottom of container C will be connected through pipe 24, valve zone $d^1$ and pipes 23 and 123 to the bottom of container S; and the top of container S will be connected to relief valve P and vent outlet $p$ through valve zone $d^3$ by which connection is made from pipe 20 to pipe 64 and thence through pipe 11 to the relief valve P. Liquid will then be forced, under pressure supplied by container G, from container C back to container S, container S being vented to maintain the predetermined pressure in the system determined by relief valve P. The liquid thus flowing back from container C to container S passes through cooling coil 34 and may be caused to pass through the cooling coil 31 by closing valve 93 and opening valves 97 and 98.

If the liquid supply container S is at a substantially lower level than container C, then by closing the gas shut-off valve 68 and turning the movable element of valve 62 to its second position, the liquid may be returned by gravity from container C to container S. With valve 62 in this position and valve $d$ in its fourth position, the tops of containers C and S are connected with each other and with the pressure relief valve P through valve 62. The desired predetermined pressure will thus be maintained in both containers and in the connecting pipe and liquid will flow by gravity from container C to container S.

If, with the unitary valve $d$ in its fourth position and valve 62 in its second position, and gas container G shut off, valve 92 in pipe 23 is closed and valves 94 and 96 opened to connect circulating pump 95 in pipe 23, then, whether supply container S is at a lower level than container C or not, liquid can be caused by means of the pump to flow between containers S and C in either direction according to the direction in which the pump is operated, and in this case again, the desired predetermined pressure in the containers and in the connecting piping will be substantially maintained, and the liquid may be caused to flow through the cooling coil 31 and may thus be cooled as desired by passing it the necessary number of times through the coil. If the gas container is not shut off and if the pressure reducing valve V is set at the same predetermined dispensing pressure as the relief valve P, then liquid may be dispensed during this back and forth flow between the containers without alteration of pressure or gaseous content of the liquid.

If the pipes 120 and 123 are disconnected from the terminals 80 and 90 and the terminals are connected by suitable means, as by a pipe 58 as shown in Fig. 4a, then, with the unitary valve $d$ in its fourth position and valve 62 in its second position, liquid may be circulated by means of pump 95 from container C through the cooling coil 31 and then through the connecting pipe 58, valve zone $d^3$, pipes 64 and 11, valve 62, pipe 63, valve zone $d^2$ and pipe 8 back to container C. The liquid in container C may thus be cooled by so circulating it through coil 31 as often and as much as may be necessary for maintaining it at the desired temperature, the desired predetermined dispensing pressure being at all times maintained so that liquid is maintained in proper condition and may be dispensed during such circulation as well as when not being circulated.

It will be seen that during any transfer of liquid between the containers S and C there is communication from the top of the container receiving the liquid to the pressure relief valve P; also, that by setting the reducing valve U and relief valve P at the same pressure, the same predetermined pressure may at all times be maintained in container C so that liquid can at all times be dispensed from container C under this predetermined pressure. It is to be noted, further, that the cooling medium around the coil 31 may be one having a temperature much below freezing, such as dry ice, without danger of the liquid freezing in the coil, since the dispensing container C may be, as it most desirably is, of substantially greater capacity than the delivery container S, so that the entire contents of container S may be transferred in one continuous operation to container C and that no liquid will remain motionless in or near the coil 31. The container C is most desirably heat-insulated as stated, and whether so insulated or not, and whether or not surrounded in container B by a cooling medium, the liquid may be cooled whenever necessary or desirable by being circulated through the coil 31 as has been described. The coils 34 and 2 may obviously be dispensed with.

Fig. 5 shows, partly in section, an apparatus similar to that of Fig. 4 but having a larger heat insulated storage container C' and the apparatus being mounted within the body of a delivery truck E. The unitary control valve and other valves and piping within the rectangle D of Fig. 4 are within the casing D', and this casing and the gas supply container G are mounted within a housing X having a door Y. The control valve within casing D' is connected to the container C' as in Fig. 4 by pipes 24, 8, and 84, and the terminals 80' and 90' correspond to the terminals 80 and 90 of Fig. 4.

From the description of the apparatus of Fig. 4 and its use and operation with its control valve in different positions, it will be understood that container C' of Fig. 5 may be filled by connecting to the terminals 80' and 90' pipes leading from a supply container or source as the pipes 120 and 123 are connected to terminals 80 and 90 in Fig. 4. It will also be apparent that by connecting the terminals 80' and 90' of the truck apparatus of Fig. 5 with terminals 80 and 90, respectively, of a stationary apparatus such as shown in Fig. 4, and suitably adjusting the unitary control valves of both apparatus, liquid may be transferred from the container C' of the truck apparatus to container C of the stationary apparatus, the truck apparatus thus serving as a liquid supply and delivery means for stationary apparatus. Also, liquid may, of course, be transferred back from container C of the stationary apparatus to container C' of the truck.

Referring now to Figs. 6, 7, 8, and 9, these figures show an apparatus according to the invention mounted within a casing to form a self-contained unit which as shown is mounted on casters to give it mobility. Various parts of the apparatus, as with the other embodiments illustrated, may be of any suitable size, type or construction. The heat insulated housing Z mounted on casters 401 has mounted within its lower part a liquid storage and dispensing container C, and has in its upper part a gas supply container G and a heat-insulated housing 30 containing a cooling coil 31 and a suitable refrigerating means, such as dry ice 35. The upper front of the housing Z is formed by a removable faucet board 407 on which is mounted faucet F and vent outlet $p$. On one side wall 408 of the housing is mounted, conveniently near the faucet F, the liquid and gas terminals 90 and 80, respectively, the liquid flow sight indicator 101, a valve control handle 41, and a liquid level sight gage 50 with a scale 51 for indicating the amount of liquid in container C. The bottom of container C most desirably slopes toward an outlet from which pipe 1 leads to coil 2 from which pipe 3 extends to faucet F and gas tube or reservoir 4. Container C has a removable cover 403 secured by wing nut 402. Extending upward from the cover 403, is the valve body or stationary element of a unitary control valve $dd$, the movable element 42 of which has a shaft which extends through the wall 408 and carries the handle 41.

To the under side of container cover 403 is secured a valve box 201 for a valve 205 operated by a float 204, the arm which carries the float being connected to the arm which carries the valve through a stuffing box in the usual manner. When the liquid in container C rises above a certain level, the float is raised to operate the valve to close the opening 206 in the valve box, and when the liquid level falls, the valve is unseated. From the opening 206, tube 85 extends down within container C to a spirally curved end portion which has numerous small apertures 252 along its upper side and a number of larger apertures 253 along its under side.

In the lower part of the stationary part or body of valve $dd$, there is a right angle port 39 one leg of which is extended by tube 25 opening into valve box 201 and the other leg of which is connected to a port 49 in the valve body either by pipe 331, coil 34 extending about the container C and pipe 332, or by pipe 321, coil 31 and pipe 322. Another port 48 in the lower part of the valve body is connected to port 49 by pipe 82, reducing valve U and pipe 84. A connection between pipes 82 and 84 containing shut-off valve 86 provides means for by-passing reducing valve U. The lower part of the valve body also contains another port 79 which opens at h into container C.

Figure 9:
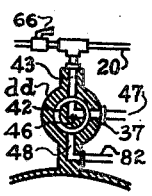
Fig. 9 is a detail sectional view taken through the main valve of Fig. 6.

In the upper part of the valve body above the valve bore there is a port 53 from which connection is made by a pipe 23, flow indicator 101 and pipe 29 to terminal 90 from which connection may be made to a beer keg or other liquid supply container; a port 43 from which connection is made through pipe 20 to terminal 80 from which gas connection may be made to the liquid supply container; port 77 from which connection is made through pipe 11 and pressure relief valve P and pipe 65 to the vent outlet p; and also a right angle port 76 from one end of which a pipe extends to a pressure safety valve N and from the other end of which connection is made through pipe 17 containing a shut-off valve 68 and pressure reducing and regulating valve V to the gas supply container G, which is provided also with the usual shut-off valve 40. From this port 76 there is also a connection by a pipe 47 to a port 37 in the side of the valve body, as shown by Fig. 9.

The movable valve member 42, the shaft of which extends through the wall 408 and carries handle 41, has two through ports 52 and 78 and a right angle port 46, and when this valve member is in the position shown its port 52 connects ports 49 and 53, its port 78 connects ports 77 and 79, and its port 46 connects ports 37 and 43. When valve member 42 is turned 90° clockwise from the position shown, communication between the ports 53 and 49 and between ports 77 and 79 and between ports 37 and 43 is closed, and port 37 is connected with port 48.

Pipe 20, which leads to gas terminal 80, is connected to pipe 11, which leads to relief valve P, through a shut-off valve 66 which is normally closed. Shut-off valve 68 is normally open. These two valves may be operated in unison by a handle 69 pinned to the handles of the two valves so that one valve is closed when the other is opened. By-pass valve 86 is normally closed.

Assuming that pipe 120 connected to terminal 90 and pipe 123 connected to terminal 80 lead to the bottom and top, respectively, of a liquid supply container, such as the container S of the other figures, and that the valve member 42 is in the position shown, then a predetermined gas pressure controlled by the valve V will be applied to the liquid supply container from container G through valve ports 37, 46 and 43, and liquid will be forced by this applied gas pressure from the supply container to the dispensing container C through valve ports 53, 52, and 49 and through port 39 to the valve box 201 and thence through pipe 85 and out through the large apertures in the spiral end portion of pipe 85 in the bottom of container C, the liquid being cooled on its way to container C by passing through cooling coil 31 or cooling coil 34. During this filling of container C, a predetermined pressure determined by the relief valve P will be maintained in container C, excess pressure being relieved through ports 79, 78, and 77 and pipes 11 and 65 leading to vent outlet p through valve P.

When the valve member 42 is turned 90° clockwise from the position shown, the flow connection between the liquid supply and container C, and the connection between gas container G and the liquid supply container, and the connection between container C and vent outlet p, will be cut off, and gas pressure will be applied to container C from container G through the valve ports 37, 46, and 48, the pressure of the gas reduced by valve V being further reduced to the desired dispensing pressure by valve U, the gas so supplied to container C escaping from the apertures in pipe 85 near the bottom of the container to rise up through the liquid therein. The valve U and relief valve P may have the same setting so as to maintain the same pressure in container C during transfer of liquid thereto and during dispensing after connection to the liquid supply is cut off. By opening the valve 86 to by-pass the reducing valve U, full pressure from reducing valve V may be applied to container C. By so applying higher pressure gas, the liquid in container C may, if necessary or desirable, be readily recharged with carbon dioxide gas. It is to be noted, also, that the gas flowing into the liquid in container C by passing through the low temperature cooling coil 31 will be cooled and will cool the liquid in the container.

By operating the handle 69 to close valve 68 and open valve 66 with movable valve member 42 in the position shown, the gas pressure line from container G may be closed and communication established between the bottoms of container C and the gas supply container and communication also established between the tops of the two containers so as to equalize the pressure in the two containers and in the connecting piping, and then, if the liquid supply container is at a lower level than container C, the liquid will flow from container C back to the liquid supply container, the pressure on the liquid being at all times maintained as determined by the valve P. The liquid may thus be caused to flow back and forth between the liquid supply container and container C by manipulating the valve handle 69, and the liquid will be cooled by passing through the coil 31, or to a less degree by passing through coil 34, in its passage in either direction. As stated, the coil 31 may be cooled to provide a sub-freezing-temperature cooling zone without danger of the liquid becoming frozen in or near the coil since liquid in the coil can always be in motion and never stand still in the coil.

While carbon dioxide is, as stated, the gas most desirably used for applying gas pressure to the supply container and the dispensing container, the term "gas" as used in the claims will be understood in its broad sense as including other gases including air. The term "sub-freezing temperature" will be understood as meaning temperature below the freezing temperature of the beverage.

What I claim is:

1. The method of handling and dispensing a gas-charged beverage, which comprises transferring all the contents of a supply container to a dispensing container while venting the dispensing container to maintain a back pressure therein, closing the liquid flow connection between the containers, applying to and maintaining in the dispensing container a controlled gas pressure, and dispensing the beverage from the dispensing container.

2. The method of handling and dispensing a gas-charged beverage, which comprises transferring the beverage from a supply container to a dispensing container by applying gas pressure to the supply container while venting the dispensing container to maintain a predetermined pressure therein, thereafter closing the liquid flow connection between the containers, applying to the dispensing container a controlled dispensing gas pressure lower than the gas pressure applied to the delivery container, and dispensing the beverage from the dispensing container under such lower pressure.

3. The method of handling and dispensing a gas-charged beverage, which comprises transferring the beverage from a supply container to a dispensing container by applying gas pressure to the supply container while venting the dispensing container to maintain a predetermined pressure therein, and thereafter by a single manual operation closing the liquid flow connection between the containers and shutting off the gas supply to the supply container and applying to the dispensing container a controlled dispensing gas pressure lower than the gas pressure applied to the supply container, and dispensing the beverage from the dispensing container under such lower pressure.

4. The method of handling and dispensing a gas-charged beverage, which comprises transferring the beverage from a supply container to a dispensing container by applying gas pressure to the supply container while venting the dispensing container to maintain a back pressure therein, thereafter closing the liquid flow connection between the containers, applying to the dispensing container from the same source from which pressure was applied to the supply container a controlled gas pressure lower than the gas pressure applied to the supply container, and dispensing the beverage from the dispensing container under such lower pressure.

5. The method of handling and dispensing a gas-charged beverage, which comprises transferring the beverage from a supply container to a dispensing container while venting the dispensing container to maintain a back pressure therein, cooling the beverage after such transfer by causing it to flow from the dispensing container through a cooling zone and back to the dispensing container, closing the liquid flow connection between the containers, applying to and maintaining in the dispensing container a controlled gas pressure, and dispensing the beverage from the dispensing container.

6. The method of handling and dispensing a gas-charged beverage, which comprises transferring the beverage from a supply container through a cooling zone to a dispensing container while venting the dispensing container to maintain a back pressure therein, further cooling the beverage after such transfer by causing it to flow from the dispensing container through said cooling zone and back to the dispensing container, closing the liquid flow connection between the containers, applying to and maintaining in the dispensing container a controlled gas pressure, and dispensing the beverage from the dispensing container.

7. The method of handling and dispensing a gas-charged beverage, which comprises transferring the beverage from a supply container to a dispensing container while venting the dispensing container to maintain a back pressure therein, cooling the beverage after such transfer by causing it to flow from the dispensing container through a sub-freezing temperature cooling zone and back to the dispensing container, closing the liquid flow connection between the containers, applying to and maintaining in the dispensing container a controlled gas pressure, and dispensing the beverage from the dispensing container.

8. The method of handling and dispensing a gas-charged beverage, which comprises transferring all the contents of a supply container through a sub-freezing temperature cooling zone to a dispensing container, closing the liquid flow connection between the containers, applying to and maintaining in the dispensing container a controlled gas pressure, and dispensing the beverage from the dispensing container.

9. The method of cooling the beverage in a dispensing container, which comprises causing beverage to flow from the container through a sub-freezing-temperature cooling zone and back to the container, and maintaining at all times on the beverage a predetermined gas-retaining dispensing pressure.

10. The method of handling and dispensing a gas-charged beverage, which comprises transferring the beverage from a supply container to a dispensing container, thereafter withdrawing beverage from the dispensing container and cooling it and returning it to the dispensing container while maintaining the beverage under pressure, applying to and maintaining in the dispensing container a controlled gas pressure, and dispensing the beverage from the dispensing container.

11. The method of handling and dispensing a beverage, which comprises applying gas pressure to a supply container and thereby completely transferring the liquid contained therein to an adjustably vented dispensing container, and after such transfer is completed and by a single manual operation shutting off the gas connection to the supply container and the liquid transfer connection, and applying a controlled gas pressure to the dispensing container for dispensing the beverage transferred thereto.

12. The method of handling and dispensing a beverage, which comprises applying a gas under pressure to an original package of bulk beverage and thereby transferring the said beverage from the package to a cooling container which is of at least equal capacity and under normal operation contains gas therein under a predetermined dispensing pressure, venting the container and adjusting the rate of venting and the transfer of the fluid into said container to maintain a dispensing pressure upon the beverage at all times during the transfer.

13. The method of handling and dispensing a gas-charged beverage, which comprises transferring beverage from a supply source to a dispensing container in any desired volume up to the capacity of the container, venting the container to maintain a back pressure therein sufficient to keeep gas in the transferred beverage during such transfer, closing the liquid flow connection between the supply source and the dispensing container, applying gas pressure to the dispensing container for dispensing the beverage therefrom, and dispensing the beverage from the dispensing container.

14. Beverage cooling and dispensing apparatus, comprising a dispensing container having a capacity sufficient to receive the entire contents of a supply container at a single operation; means for supplying gas under pressure; a refrigerating device; a valve arrangement including a single operating element; means, including a pressure regulator, connecting said gas supplying means to said dispensing container; venting means for relieving excess pressure from the dispensing container; and means for establishing communication, in one setting of the valve arrangement, between the gas supplying means and a supply container connected to the apparatus, and between the supply container and the dispensing container, and between the dispensing container and the venting means, and for establishing communication, in another setting of the valve arrangement, between the gas supplying means and the dispensing container.

15. Beverage cooling and dispensing apparatus, comprising a dispensing container having a capacity sufficient to receive the entire contents of a supply container at a single operation; means for supplying gas under pressure; a pressure regulator connected to said gas supplying means; venting means for relieving excess pressure from said dispensing container adapted to cooperate with said regulator to maintain a predetermined pressure in the dispensing container; a valve arrangement; and means for establishing communication through the valve arrangement, in one setting thereof, between the gas supplying means and a supply container connected to the apparatus, and between the supply container and the dispensing container, and between the dispensing container and the venting means, and for establishing communication through said valve arrangement, in another setting thereof, between the gas supply means and the dispensing container.

16. Beverage dispensing apparatus, comprising a dispensing container, a filling conduit leading to said container for the transfer of beverage to said container from a supply container detachably connected to said conduit, a shut-off valve in said conduit, means for applying gas pressure from said pressure source to the supply container sufficient to force beverage therefrom into the dispensing container, a vent from the dispensing container, a pressure relief valve arranged to cooperate with the vent to maintain a predetermined back pressure in the dispensing container during the transfer of beverage thereto, and means for applying gas pressure from said pressure source to the dispensing container.

17. Beverage dispensing apparatus as defined in claim 16, in which the means for applying gas pressure to the dispensing container applies a pressure thereto lower than the pressure applied to the delivery container.

18. The method of preventing a gas-charged beverage from becoming flat or cloudy while remaining in a cooled conduit leading from a dispensing container, which comprises accumulating in a reservoir connected to said conduit gas discharged from the beverage when its flow through the conduit is stopped, and maintaining such gas in contact with beverage in the conduit to be absorbed by the beverage as the temperature of the beverage falls.

19. Beverage dispensing apparatus, comprising a dispensing container having a dispensing outlet, refrigerating means, means for transferring beverage from a supply container through the refrigerating means to the dispensing container, circulating means, and control means adapted to cut off communication between the supply container and the dispensing container and to cause the circulating means to circulate beverage from the dispensing container through the refrigerating means and back to the dispensing container, and means for subjecting the beverage at all times to gas pressure for forcing the beverage to the dispensing outlet.

20. Beverage dispensing apparatus, comprising a dispensing container having a dispensing outlet, means for supplying gas under regulated pressure, a vent outlet and cooperating pressure relief valve, means providing flow passages through which the dispensing container and the gas supplying means may be connected to a detachably connected beverage supply container and the gas supplying means may be connected to the dispensing container and the dispensing container to the relief valve and vent outlet, and valve means for controlling the flow through said passage to connect the gas supplying means to the supply container, the supply container to the dispensing container, and the dispensing container to the pressure relief valve and vent outlet, and, alternatively, to connect the gas supplying means to the dispensing container.

21. Beverage dispensing apparatus as defined in claim 20, in which the dispensing container is of capacity sufficient to receive the entire contents of the supply container at a single operation.

22. Beverage dispensing apparatus as defined in claim 20, having a pressure regulator for further reducing the pressure of the gas applied to the dispensing container.

23. Beverage dispensing apparatus as defined in claim 20, having a pressure regulator for further reducing the pressure of the gas applied to the dispensing container, and a normally closed valve-controlled by-pass across said regulator.

24. Beverage dispensing apparatus as defined in claim 20, having a sub-freezing temperature cooling device connected in the flow passage through which the beverage flows from the supply container to the dispensing container.

25. In an apparatus for dispensing a gas-charged beverage, the combination with a dispensing container, a dispensing faucet, a connecting tube leading from the dispensing container to the faucet, and means for cooling the beverage in said tube, of a branch tube or reservoir extending upward from said connecting tube adapted to hold liquid and gas under pressure, whereby gas discharged from the beverage when its flow through said connecting tube is stopped is available to be absorbed by beverage standing in the connecting tube as the temperature of the beverage falls.

26. Apparatus as defined in claim 25, having a connection to said branch tube or reservoir for supplying gas under pressure thereto.

JOHN KANN.

CERTIFICATE OF CORRECTION.

Patent No. 2,110,840.　　　　　　　　　　　　　　March 8, 1938.

JOHN KANN.

It is hereby certified that error appears in the printed specification of the above numbered patent requiring correction as follows: Page 8, first column, lines 32 and 39-40, claim 16, strike out the words "from said pressure source"; and that the said Letters Patent should be read with this correction therein that the same may conform to the record of the case in the Patent Office.

Signed and sealed this 12th day of April, A. D. 1938.

(Seal)　　　　　　　　　　　　　　　　　　　　Henry Van Arsdale,
　　　　　　　　　　　　　　　　　　　　Acting Commissioner of Patents.